United States Patent Office 3,487,639
Patented Jan. 6, 1970

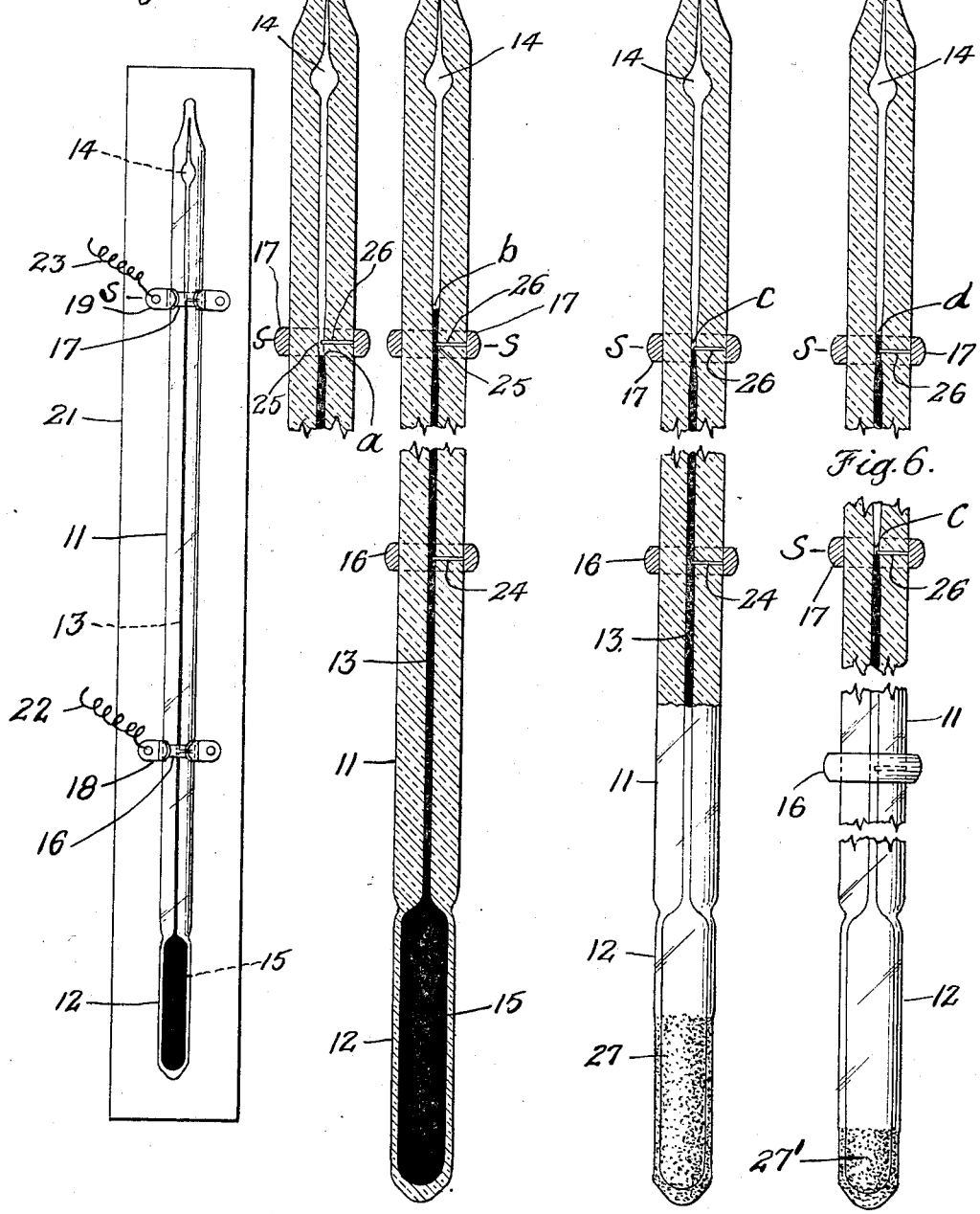

3,487,639
THERMALLY-RESPONSIVE INSTRUMENTS AND ART OF MAKING SAME
Michael M. Berkowitz, Philadelphia, Pa., assignor to Princo Instruments, Inc., a corporation of Pennsylvania
Filed Mar. 2, 1967, Ser. No. 620,102
Int. Cl. G01c 25/00; G01k 15/00, 19/00
U.S. Cl. 73—1                            13 Claims

ABSTRACT OF THE DISCLOSURE

A liquid-in-glass thermostat, containing also a gas under pressure, has a constriction in the capillary tube at a control point where the instrument is to have a great sensitivity, and a weakened area of the bulb wall of the thermostat cooperates with the liquid and gas in determining the desired set-point. In the manufacture of the thermostat, or after a period of ageing, the final adjustment of the set-point is obtained by etching or grinding off a part of the bulb wall.

---

This invention relates to thermally-responsive instruments, and more particularly to thermostats, although it is of use in thermometers, and also in thermostats graduated to give a thermometric reading; and the invention also relates to methods of making such instruments, and more particularly to the calibrating phases of the manufacture thereof.

More specifically, the invention deals with instruments having a thermally-responsive liquid contained within a hollow transparent body, typically glass, such liquid having the characteristic of being visible, or of being conductive of electricity, or both. Thus, the invention is especially useful in a thermally-responsive instrument, such as a thermostat, wherein the liquid comprises or consists of mercury, and wherein the containing body is of glass, preferably having a bore which incorporates, in sequence, a bulb, a capillary tube, and an expansion chamber, and also wherein a gas under pressure is contained within the expansion chamber and bears upon the surface of the liquid within the capillary tube.

In such instruments, it is quite difficult to obtain a very accurate registration of the column of liquid in the capillary tube (under a specific volume of gas at a particular pressure) with the scale on the instrument, in the case of a thermometer, or with the thermostat control point, in the case of a thermostat. This is especially true in the case of a thermostat which may, in storage or use, be subjected to a rather wide range of ambient temperatures, but which is intended to function with exceptional accuracy over a very small portion of said range.

In general, in the manufacture of such instruments, the effort is to so calibrate them that the reading and/or the functioning (in case of a thermostat) is very accurate at what is termed the "set-point." Of many possible examples of applications where great accuracy is required of a thermostat, a typical one is the use of such an instrument in an incubator, for example such as employed in a chicken hatchery, wherein the thermostat, through suitable relays, must control the temperature within a few hundredths of a degree. Furthermore, for the incubation of different types of eggs it may be necessary to have a number of different thermostats, whose respective setpoints may be only a few hundredths of a degree apart from one another.

The problem of obtaining such accuracy is aggravated by several factors: One of these is the necessity of having an electrical contact or conductor, which passes through the glass wall of the body of the instrument, located exactly at the set-point; or, stating it the other way around, with an instrument having such a conducting wire penetrating the glass wall and having its inner end exposed to the capillary tube, it is a problem to secure such a relationship between the volume of the mercury incorporated in the instrument and the volume and pressure of the gas which fills the expansion chamber and bears upon the mercury, that the head of the mercury column will be exactly at the set-point at the selected temperature.

Another factor is the disturbing effect of changes in the glass body, from its designed size, proportions and other characteristics, arising from annealing of the body and/or from ageing of the instrument after manufacture, such ageing for example causing significant shrinkage of the glass body over a period of for example 6 to 9 months. Such shrinkage will normally raise the mercury column above the set-point, at a selected temperature, if it was exactly at the set-point, at that temperature, when the instrument was first manufactured.

The purpose of the present invention is to obviate the above problems.

The present invention contemplates, basically, the provision of a thermally-responsive instrument which is accurate, despite the above problems, and also a technique of calibrating such instruments during manufacture, and/or after ageing, by accurately adjusting the location of the head of the mercury column with reference to the intended set-point, without having to resort to opening of the body and changing the volume of the mercury and/or of the gas under pressure therein, which latter is the typical practice in the prior art, a practice which is obviously troublesome, wasteful and expensive.

How the objects and advantages of the invention are obtained will be evident from a consideration of the following description taken together with the accompanying drawings.

FIGURE 1 is a face view of a thermally-responsive instrument, in this case a thermostat, typically embodying the preferred construction of the present invention, made in accordance with the technique of this invention, the drawing being substantially to actual scale, and showing a thermostat having two contact rings, for a control circuit, and a pair of brass clips for engaging said rings and for securing the thermostat to a frame or base.

FIGURE 2 is a longitudinal vertical section, to an enlarged scale, of the upper portion of the thermostat, showing the upper contact ring, also a portion of the capillary tube, drawn to an exaggerated diameter, for ease of illustration, and further showing a constriction in said tube at the set-point, and also showing the expansion chamber at the top of the instrument. This figure also shows a platinum alloy wire extending through the glass body of the instrument, connected at its outer end to the contact ring and exposed at its inner end to the capillary tube at the point of minimum bore, this figure also showing the top of the column of the liquid of the instrument, at a location below the set-point, as occurs under certain conditions of manufacture hereinafter described.

FIGURE 3 is a sectional view similar to FIG. 2, but showing the whole thermostat, excepting for a broken out portion between the upper and lower contact rings; this figure further showing the head of the liquid column as being slightly above the set-point, as occurs at a typical later stage in the manufacturing or calibrating procedure.

FIGURE 4 is a view similar to FIG. 3, but illustrating the lower portion of the instrument in elevation, and showing the weakening of the body of the instrument over an area comprising approximately the lower half of the bulb portion thereof, this weakening being obtained by an etching, a sand-blasting or a grinding off of a part of the glass wall which is thus thinned ever so slightly. This figure further illustrates the resultant lowering of the head of the column of liquid from the level shown in FIGURE 3 to the level of the set-point of the instrument.

FIGURE 5 is a view of the upper portion of an instrument, similar to the view of FIG. 2, but showing the head of the liquid column slightly above the set-point, in the course of calibration of the instrument by a modified technique.

FIGURE 6 is a fragmentary view showing the lower and the mid-portions of the instrument of FIG. 5, including both of the contact rings, and illustrating the calibration of the instrument to the intended set-point, by an etching, sand-blasting or grinding operation on approximately the lower quarter of the bulb portion.

By reference first to FIG. 1 it will be seen that the instrument, which for purposes of illustration is a thermostat, comprises a transparent body 11 preferably of glass, which in the present example is about 7½" long and contains within it, in sequence, a bulb 12, a capillary tube 13 extending from one end of the bulb, and an expansion chamber 14 at the opposite end of the capillary tube. The bulb is filled with a thermally-responsive liquid 15. Although other known types may be used, in the present example I use refined mercury, which is readily visible for viewing, if desired, and is a conductor of electricity and thus especially suited for a thermostat of this type. The mercury of course rises and falls within the capillary tube 13, and the head of the column of mercury is subjected to the pressure of gas which fills the expansion chamber 14 and the portion of the capillary tube above the mercury. The gas in this typical thermostat is hydrogen, although nitrogen, helium or other gases (preferably inert) and mixtures may be used. In the present example, the instrument is filled, above the liquid, with gas at about 10 atmospheres (approximately 150 p.s.i.), although it is not unusual to employ pressures in liquid-in-glass thermostats ranging from about 50 p.s.i. to about 350 p.s.i.

It should be understood that materials, sizes, weights, proportions, pressures, etc. as given herein are by way of example only and not by way of limitation excepting where they are significant as to practical operativeness. In the present example, the bulb 12 is about 1" long, and the capillary tube from there to the expansion chamber is about 6". The bulb has a capacity of about 0.3 cubic centimeter, and the capillary tube may be so designed that when the bulb is filled with mercury, at a certain pre-determined low temperature (for example .0° F.), the mercury will rise in the tube up to about the bottom of the expansion chamber when the temperature is about 115° F. Typically, the set-point for this instrument is 100° F. and is located at the level indicated by the reference letter S, for example about an inch below the center of the expansion chamber.

The capillary tube is typically $10/1000$ of an inch in diameter, excepting for a restriction at the region of the set-point, as will be described further with reference to FIGS. 2 to 6 of the drawings.

Alhtough other types, numbers and arrangements of electrical connections may be used, depending upon the intended use of the thermostat, in the present example the instrument has two electrodes 16 and 17 in the form of metal bands surrounding the body, one adjacent the set-point S and the other about 3½" below the same. Each electrode is connected to the interior of the body by a wire contact which is sealed into the glass, as will be described hereinafter. For convenience, the electrodes may serve also as mounting rings, cooperating with brass mounting clips or other spring-like devices 18 and 19, which serve to support the instrument on the base 21, which may be of wood, plastic, metal or other materials, depending upon the use of the instrument. Wire leads 22, 23, may readily be taken off from the spring supports 18 and 19, for connection to electrical relays or to any other desired points, for purposes of actuating a signal, an alarm, or a controlling device.

It will be apparent that the instrument (comprising the glass body, with the materials enclosed therein, and the two rings 16 and 17) may readily be slipped in and out of the two supporting brackets 18 and 19.

Turning now to FIGURES 2 and 3, it will be seen that the wire 24, connecting the ring 16 with the bore 13, passes right through the glass body 11 and extends slightly into the capillary tube, just sufficiently to make certain that there will be contact between the wire 24 and the mercury in the tube. The head of the mercury column will normally be at or above the level of the wire 24 at a temperature of about 65° F., for example.

Adjacent the upper contact ring 17, the capillary tube is constricted. For example, if for most of the tube's length it is $10/1000$" in diameter, it may be restricted, at the level of the ring 17 (the center of which is the set-point for this instrument) to a diameter of about $1/1000$", as shown at point 25, which is at the level designated S in FIGURE 1. The constriction may extend, in a tapered fashion, about $1/16$" above and below the point 25. At this point, the wire 26 passes through the glass wall, and has its inner end exposed to the capillary tube at the point of maximum constriction. For an instrument of the present size and purpose, the wire 26 will extend into the capillary tube a distance not over $1/1000$". The wire 26 at its outer end is connected with the ring 17.

In order that the wires 24 and 26 may be tightly sealed in the glass they must have a coefficient of expansion similar to that of the glass body. For a typical glass in such an instrument, the wire may be a platinum alloy wire comprising for instance 94% platinum and 6% iridium. The diameter of the wire may typically be $4/1000$".

It will now be obvious that if the take-off connections 22 and 23 are coupled into a signal or controlling circuit, it can readily be arranged that the thermostat will close the circuit at the temperature which exists when the head of the column of mercury reaches the constriction 25 and makes contact with the wire 26, which in this instance is at a temperature of 100° F. With the instrument shown, a drop in temperature of a few hundreds of a degree will cause a drop in the position of the top of the mercury column sufficient to break the circuit. Arcing between the mercury column and the wire 26 is prevented by the gas under pressure which is bearing upon the head of the column.

In the example given, this thermostat may be used for controlling the heater in an incubator. When the mercury column contacts the wire 26 and closes the circuit (indicating, in this instance, an ambient air temperature of 100° F. in the incubator) the heat will be shut off. When the ambient air drops a few hundredths of a degree, i.e., enough to break the connection between the head of the mercury column and the wire 26, the circuit will be opened and the heating system will be turned on.

A thermostat for some other use, for example, an orchard or greenhouse alarm instrument, may be designed to indicate or give a signal when the temperature in the orchard or greenhouse drops for example below 34° F. so that steps may be taken to light a smudge fire in the orchard, or to turn on the heat in the greenhouse.

In the manufacture of an instrument of the character herein described it is quite difficult to obtain accurate calibration to a given desired set-point. This will be apparent from several considerations, for example the variables which exist with respect to the bore of the capillary tube, the difficulties present in embedding the wires in the glass, the problem of providing a bulb and an expansion chamber of exactly desired dimensions, the problem of measuring the exact quantity of mercury desired, and the problem of filling the upper part of the instrument with exactly the right volume of gas at standard temperature and pressure; especially since a number of these operations must be done with the glass at different temperatures, and the tube must of course be finally sealed under a compressed gas atmosphere. Just by way of example, it should be pointed out that to insert the wire 24, the glass body must be broken at that point, the wire positioned in place, and the body heated and rejoined. The same thing must of course be done for the wire 26. Also, special heating must be done at the level S, in order to form the construction 25. These and other problems in connection with obtaining an accurate instrument are well known in the art, and it is likewise well known that even with the most skillful workmen it is not possible to produce a large quantity of instruments of this character that will all register correctly at the set-point for a given selected temperature. It has been customary in the art, when any particular instrument does not register accurately at the set-point to re-insert the instrument in the filling and sealing equipment, re-open the top of the body and change the pressure and volume of the contained gas and then re-seal the instrument; and if the divergence from accuracy is too great, it has even been necessary to remove or add mercury until the correct registration is obtained. This is of course a troublesome and expensive procedure.

It should further be pointed out that the annealing of the glass, during manufacture, will cause variations in the contained volume, by expansion or contraction. Furthermore, where a completed instrument is aged for a long time—and especially when ageing is used in whole or in part as a substitute for annealing, the instrument will normally shrink over a period of several months or even up to a year, and the mercury will thus rise above the set-point for the selected temperature.

In accordance with the present invention, when the instrument, as first made, has a liquid level slightly below the set-point (for the selected temperature), for example as shown at $a$ in FIG. 2; or even if the level $a$ should come exactly at the set-point S when first made, nevertheless after a period of ageing, with the normal shrinkage of the glass, and thus with contraction of the contained volume, the mercury will rise, for example to the point $b$ (for the selected temperature) as shown in FIG. 3.

In accordance with the present invention, an area of the bulb 12 is weakened, for example by a very slight thinning of the bulb wall. This can be done by etching, grinding, or sand-blasting, and in the example shown in FIG. 4 the surface of the lower half of the bulb has been ground off slightly, as at 27. This abrasion or etching, and thus thinning or weakening of the body, is carried to the point that, with the instrument at the selected temperature, the pressure of the gas above the mercury column will drive the column down until the head of it is exactly at the set-point S, as shown by $c$ in FIG. 4.

If the instrument, by annealing during manufacture, is in effect "pre-shrunk," so that little or no ageing is needed, registration may initially be made higher than the set-point—for example as shown at $d$ in FIG. 5. This point $d$ may vary over a range, so that the initial construction of the instrument does not have to be quite as meticulous. The bulb 12 is then etched, blasted, or ground, for example as shown at 27' as seen in FIG. 6, and the gas pressure above the mercury will bring down the level of the top of the mercury column, as shown at $c$ to the level of the set-point S. In this instance, the abrasion covers an area of about ¼ of the bulb, but of course the area and depth of this operation is in all cases indicated by the amount needed to bring down the liquid level to the set-point at the selected temperature.

I claim:
1. A thermally-responsive instrument comprising a body of glass or the like, having, in sequence therein, a bulb, a capillary tube and an expansion chamber, a thermometric liquid in said bulb of a volume such that the liquid rises and falls within said tube, with temperature changes, within the predetermined operating range of the instrument, a gas under pressure in said chamber and bearing upon the end of the column of said liquid in the capillary tube, and means cooperating with the liquid and the gas in determining a temperature set-point comprising an area in the bulb-wall of said body being weakened to such an extent that the pressure of said gas permanently expands the bulb at said area to bring the end of the column of liquid to the desired set-point for the selecteed temperature and thereafter provides for return of the head of the column of liquid to said set-point whenever the temperature returns to said selected temperature.

2. The instrument of claim 1 wherein said set-point is a thermostatic control point and said capillary tube has a portion of substantially reduced bore forming a constriction extended longitudinally through an area which includes the said set-point.

3. The instrument of claim 2 wherein the liquid comprises mercury, and at said control point and at a lower-temperature point there are electrical conducting wires, of a material having a coefficient of expansion similar to that of the body, passing through the body into said capillary tube, the wire at said control point being located close to the longitudinal center of said construction.

4. In the art of calibrating thermally-responsive instruments, of the type having a liquid in a hollow transparent body the method which comprises: filling the space in the body, above the liquid, with a gas under pressure, sealing the body while said pressure is such that the liquid column extends above the intended final set point for a selected temperature, and thereafter weakening the body to such extent that the gas pressure expands the contained volume of the instrument until the head of the liquid column is in substantial registry with the intended final set point at the selected temperature.

5. In the art of calibrating thermally-responsive instruments, of the type having a liquid in a hollow transparent body, the method which comprises: filling the space in the body, above the liquid, with a gas under pressure, sealing the body while said pressure is such that the liquid column extends to a level at or close to the intended final set-point for a selected temperature, ageing the instrument for such a time that the major part of the rise in the liquid column, due to shrinkage of the body, has occurred, and thereafter weakening the body to such extent that the gas pressure expands the contained volume of the instrument until the head of the liquid column is in substantial registry with the intended final set point at the selected temperature.

6. In the art of making tubular mercury-in-glass thermostats and the like, the method which comprises: filling the tubular space in the glass partly with mercury, and, above the mercury, with a gas under pressure; sealing the glass with the contained mercury of such a volume, and the gas of such volume and under such pressure that, after the normal glass shrinkage, the mercury column extends above the intended final set-point for a selected temperature; and thereafter weakning the glass to such extent that the gas pressure expands the contained volume of the thermostat until the head of the mercury column is in substantial registry with the intended final set-point at the selected temperature.

7. The method of claim 6, wherein the shrinkage of the glass is accomplished chiefly by annealing.

8. The method of claim 6 wherein the shrinkage of the glass is accomplished, at least in substantial part, by ageing subsequent to the filling and sealing of the thermostat.

9. The method of claim 6, wherein the weakening of the glass is effected by etching, sand-blasting, or grinding.

10. The method of claim 6, wherein the gas is under a pressure between about 50 and about 350 pounds per square inch.

11. The method of claim 6, wherein the gas comprises at least one of hydrogen, helium and nitrogen.

12. The method of claim 6, wherein a substantial constriction is imposed upon the tube of the instrument at the selected set-point.

13. The method of claim 12, wherein a wire, primarily of platinum, is embedded in the glass, with its inner end exposed at a point in the constricted part of the tube, prior to the filling operation.

References Cited

UNITED STATES PATENTS

| 631,095 | 8/1899 | Simpson | 73—373 |
| 695,262 | 3/1902 | Zeal | 73—373 |
| 1,942,517 | 1/1934 | Noyes | 73—371 |
| 2,993,378 | 7/1961 | Schratt | 73—1 XR |
| 3,062,035 | 11/1962 | Schratt | 73—1 |

LOUIS R. PRINCE, Primary Examiner

HARRY C. POST III, Assistant Examiner

U.S. Cl. X.R.

65—29, 30, 61; 73—371

PO-1050
(5/69)

UNITED STATES PATENT OFFICE
CERTIFICATE OF CORRECTION

Patent No. 3,487,639            Dated January 6, 1970

Inventor(s) Michael M. Berkowitz

It is certified that error appears in the above-identified patent and that said Letters Patent are hereby corrected as shown below:

Col. 4, line 17 - "10/1000" should be --3/1000--

Col. 4, line 40 - "hundreds" should be --hundredths--

Col. 5, line 5 - "construction" should be --constriction--

Col. 6, line 4 - "selecteed" should be --selected--

Col. 6, line 19 - "construction" should be --constriction--

SIGNED AND
SEALED
JUL 14 1970

(SEAL)
Attest:

Edward M. Fletcher, Jr.
Attesting Officer

WILLIAM E. SCHUYLER, JR.
Commissioner of Patents